_US006099817A_

United States Patent [19]
Lacquaniti et al.

[11] Patent Number: 6,099,817
[45] Date of Patent: Aug. 8, 2000

[54] PROCESS FOR PREPARING SODIUM CARBONATE

[75] Inventors: Luigi Lacquaniti; Guiseppe Liuzzo; Marcello Palitto; Nicola Verdone, all of Rome, Italy

[73] Assignee: Consorzio Nazionale per la Raccolta, il Riciclaggio e il Recupero Dei Rifiuti di Imballaggi in Plastica, Milan, Italy

[21] Appl. No.: 09/014,270

[22] Filed: Jan. 27, 1998

[30] Foreign Application Priority Data

May 26, 1997 [IT] Italy .................................. M197A1225

[51] Int. Cl.⁷ ............................................ C01D 7/12
[52] U.S. Cl. ................................. 423/421; 423/427
[58] Field of Search ..................... 423/421, 427

[56] References Cited

U.S. PATENT DOCUMENTS

| | | | |
|---|---|---|---|
| 1,503,481 | 8/1924 | Cocksedge | 423/427 |
| 3,482,934 | 12/1969 | Bello et al. | 423/427 |
| 4,105,744 | 8/1978 | Erdoess et al. | 423/239 |

FOREIGN PATENT DOCUMENTS

| | | |
|---|---|---|
| 0 463 367 A1 | 1/1992 | European Pat. Off. . |
| 9101793 | 5/1993 | Netherlands . |
| 723108 | 2/1955 | United Kingdom . |
| 1176679 | 1/1970 | United Kingdom . |

OTHER PUBLICATIONS

J.H.A. Kiel, et al., "The Development of Cogasification for Coal/Biomass and for Other Coal/Waste Mixtures and the Reduction of Emissions from the Utilization of the Derived Fuel Gas", ECN–Project: Coal/Biomass Cogassification and High Temperature Gas Cleaning, pp. 1–27 Sep. 1995.

W. Duo, et al., Chemical Engineering Science, vol. 51, No. 11, pp. 2541 to 2546, Kinetics of HCI Reactionw with Calcium and Sodium Sorbents for IGCC Fuel Gas Cleaning, 1996.

K. Mocek, et al., Materials Chemistry and Physics, vol. 14, pp. 219 to 227, "On the Morphological Nature of $Na_2CO_3$ Produced by Thermal Decomposition from $NaHCO_3$ and from $Na_2CO_3.10\ H_2O$" 1986.

Chemical Abstract, vol. 122, No. 8, Feb. 20, 1995, AN–88031, "Thermal Decomposition of Sodium Bicarbonate".

*Primary Examiner*—Steven P. Griffin
*Assistant Examiner*—Timothy C Vanoy
*Attorney, Agent, or Firm*—Oblon, Spivak, McClelland, Maier & Neustadt, P.C.

[57] ABSTRACT

A process for preparing sodium carbonate is provided in which sodium bicarbonate is heated to a temperature of between 80 and 250 ° C. and at a pressure between grater than 1 bar and 20 bars. The sodium bicarbonate may be heated in the presence of an activation gas containing carbon dioxide and water.

16 Claims, 9 Drawing Sheets

S.E.M. Micrographs at 600X and 2980X of the surface of a $Na_2CO_3$ grain, obtained according to the process of the present invention;

Migrographs at 600X and 2980X of the surface of a commercial sodium bicarbonate grain;

a) Fluid bed - Partial pressure $H_2O + CO_2$: 35% vol - 266 mmHg b) Fluid bed - only air Surface morphology of two different kind of carbonate.

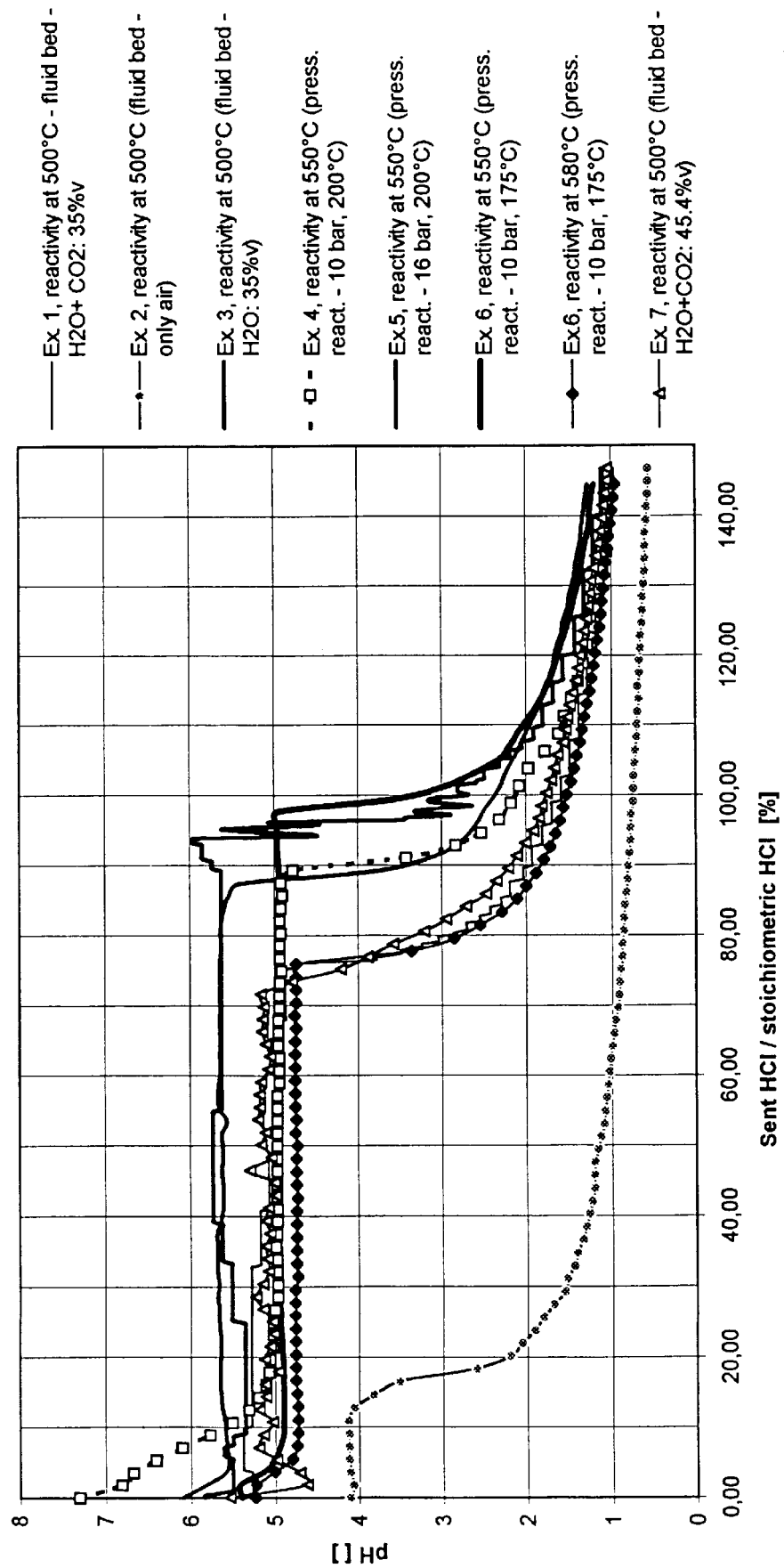

PROCESS FOR PREPARING SODIUM CARBONATE

BACKGROUND OF THE INVENTION

1. Field of the Invention

This invention relates to a reactive compound for removing acid compounds from fumes or gases at high temperature, and the process for its preparation.

2. Description of the Background

Various methods are known for preparing reactive compounds, in particular carbonates from bicarbonates, which enable products to be obtained for use as alkaline sorbents in acid fume removal processes in the gaseous phase.

SUMMARY OF THE INVENTION

The document "The Development of Cogasification for Coal Biomass and for other Coal/Waste Mixtures and the Reduction of Emissions from the Utilization of the Derived Fuel Gas", the final report of the "Coal/Biomass Cogasification and High Temperature Gas Cleaning" project of the Netherlands Energy Research Foundation ENC by J. A. Kiel et al., gives an exhaustive review and analysis of various products used as alkaline sorbents in halide removal processes. In particular, with regard to halide removal processes, attention was focused on processes operating at temperatures of between 350 and 400° C. Laboratory tests have shown that the most effective sorbent is sodium carbonate, $Na_2CO_3$, the activity of which however decreases drastically at temperatures exceeding about 400° C. (page 18, lines 10–13).

Subsequent tests on a fluidized bed system showed that a sodium carbonate, $Na_2CO_3$, obtained by calcining $NaHCO_3$ at 100–150° C. in $N_2$ until $CO_2$ development completely ceases, has a decidedly higher activity at temperatures of about 250° C. This activity gradually decreases as the acid gas removal process working temperature increases (page 18, last paragraph). These observations are in complete agreement with that known from the literature regarding increased sodium carbonate activity at temperatures of between 150 and 300° C.

Using commercial $Na_2CO_3$ as starting material, it has been likewise found that beyond 300° C., sorbent capacity decreases as the temperature increases.

In conclusion, this document states that sodium carbonate is a very valid sorbent for acid gas removal up to a maximum temperature of about 400° C.

EP-A-0463367 describes a method for removing the acid gases HCl and HF from fuel gas by contact with an $NaHCO_3$ and $Na_2CO_3$ mixture at high temperatures, ie at temperatures of between 350 and 700° C. The sorbent mixture used is not pretreated in any way.

As it is known from the literature and from the thermodynamics of this reaction that the sorbent capacity decreases considerably with increasing temperature of the removal process, this removal is of low efficiency if using unactivated products.

U.S. Pat. No. 4,105,744 describes an acid gas neutralization method using a bed of active carbonate of an alkaline metal, the active carbonate being obtained for example from an $NaHCO_3$ and $Na_2CO_3$, mixture treated at a temperature of between 30 and 200° C. (column 2) with an activating gas consisting for example of air. The product obtained in this manner is used in a gas removal process conducted however at a temperature of between 100 and 200° C.

The activated and unactivated products described in the known art hence do not enable valid results to be obtained in terms of acid compound removal efficiency at temperatures exceeding 400° C. According to the present invention, a method for preparing a reactive compound and an activated product obtainable via this process have now been found which overcome the drawbacks of the state of the art.

Specifically, this invention provides a method for preparing sodium carbonate active at temperatures exceeding 400° C., in which sodium bicarbonate $NaHCO_3$ is heat-treated at a temperature of between 80 and 250° C., at an operating pressure of between 1 and 20 bars absolute.

This heat treatment can be conducted in the presence, in contact with the solid, of an activation gas with a molar fraction of $H_2O$ and/or $CO_2$ of between 0.13 and 1.

The invention further provides a sodium carbonate obtainable by the aforedescribed process and its use in an acid gas removal process at temperatures exceeding 400° C.

The acid compounds removable using the carbonate obtained by the process of the invention can for example be HCl, HF, $SO_2$, $H_2S$, COS, $NO_x$ and $SO_x$.

The invention hence also provides a method for removing acid compounds from fumes or gases at high temperature comprising bringing said compounds into contact with the activated compound of the invention in a fixed bed or fluidized bed reactor, said contact in particular being achieved upstream of the fume or gas heat recovery stage.

An example of a removal method in which the activated compound of the invention can be used is described in Italian Patent N. 1272205.

BRIEF DESCRIPTION OF THE DRAWINGS

FIG. 9 shows a graph comparing reactivity of compounds of the examples.

DETAILED DESCRIPTION OF THE INVENTION

Figure 1A:
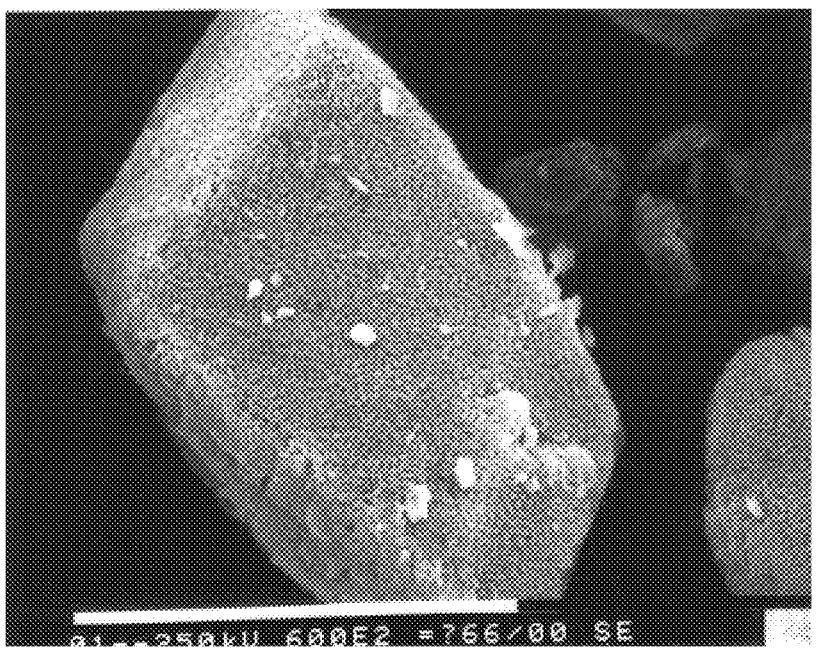
FIGS. 1A and 1B are S.E.M. micrographs of particles according to the present invention.

The main advantage of the reactive compound obtained by the process of the invention is its high efficiency in removing acid compounds at temperatures exceeding 400° C. and in its utilization economy consequent on the high reaction yield.

The method of the invention transforms sodium bicarbonate into sodium carbonate in accordance with the following heterogeneous reaction:

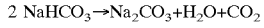

As is known from the laws of thermodynamics, with this reaction the dissociation pressure or equilibrium pressure exerted by the gases released by the reaction increases with increasing equilibrium temperature between the reactant and the reaction products. According to the invention the temperature at which this method is carried out lies between the temperature at which the reaction equilibrium pressure equals the pressure at which the method is conducted and a temperature 50° C. higher than this latter.

By way of example, the following Table A shows various pressures at which the method of the invention can be conducted, and the temperature range within which to operate at the various pressures, in the absence of activation gas.

TABLE A

| Operating pressure (bar abs) | Equilibrium temperature (° C.) | Maximum temperature (° C.) |
|---|---|---|
| 1 | 120 | 170 |
| 2 | 134 | 184 |
| 4 | 148 | 198 |
| 6 | 158 | 208 |
| 8 | 164 | 214 |
| 10 | 170 | 220 |
| 12 | 174 | 224 |
| 14 | 178 | 228 |
| 16 | 182 | 232 |

The activation gas which may be used in the preparation method of the invention consists of an air and/or inert gas, $H_2O_{vap}$ and/or carbon dioxide mixture. The water and $CO_2$ content can be for example a total of 35 vol %.

Preferably the method for preparing active sodium carbonate can be conducted at a temperature of between 100 and 120° C., at atmospheric pressure and in the presence of an activation gas, with a water and/or carbon dioxide molar fraction of between 0.26 and 0.60.

In particular, the method for preparing active sodium carbonate can be conducted at a temperature of between 120 and 170° C., and preferably between 120 and 140° C., at atmospheric pressure, in the absence of activation gas.

With activation gas absent and operating at above atmospheric pressure, the preferred temperature range is between the equilibrium temperatures shown in Table A and a temperature of 20° C. higher than said equilibrium temperatures.

With activation gas present and operating at above atmospheric pressure, the preferred temperature range is between the equilibrium temperatures shown on Table A and a temperature of 20° C. less than said equilibrium temperatures, with a water and/or carbon dioxide molar fraction of between 0.26 and 0.60. In general, if in the method of the invention the heat treatment is effected at a temperature close to the equilibrium temperature, longer times are required but products are obtained which are more active at a higher temperature.

The invention also relates to the use of this reactive compound in a reaction of acid compound removal at a temperature of between 400 and 600° C. from fumes or gases.

In particular, the reactive compound can be used as such or mixed with an inert, which can for example be silica or alumina at choice. The weight ratio of reactive compound to inert can vary from 1:3 to 3:17, depending on the method of bringing the gas and solid into contact.

The fumes or gases treated by the removal method of the invention are products of the combustion, gasification and/or pyrolysis of combustible material.

The characteristics and advantages of the inventive product will be more apparent from the following detailed description given by way of non-limiting example.

Figure 1B:
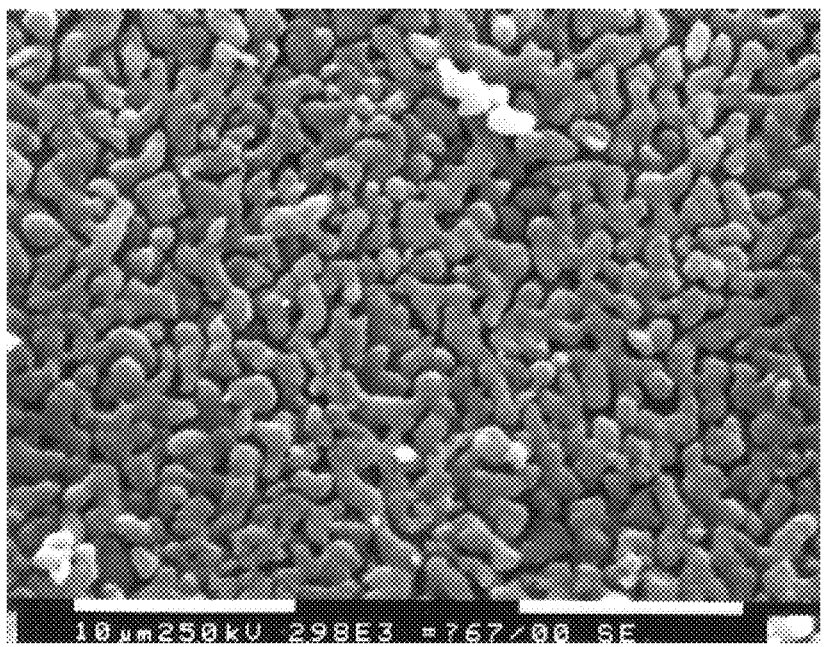
Figure 2A:
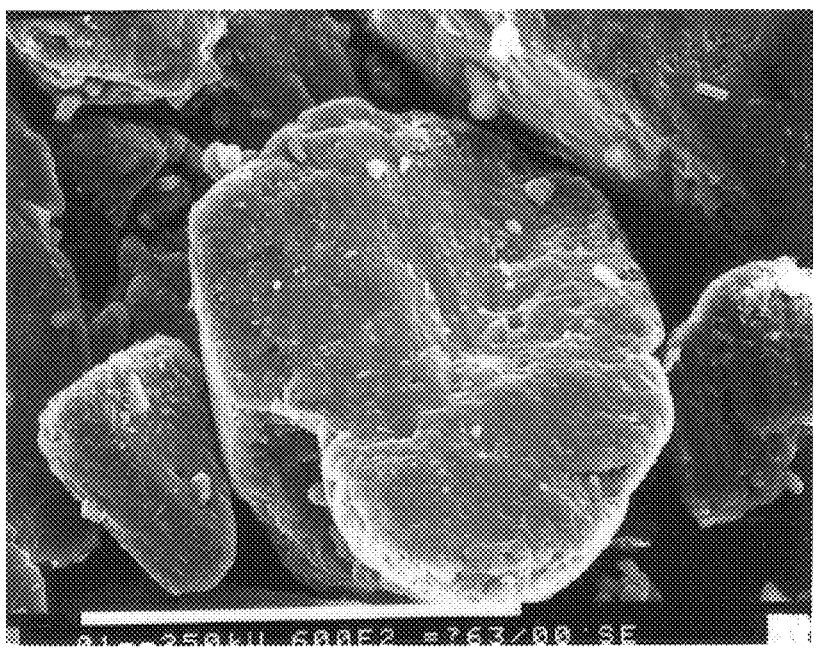
FIGS. 2A and 2B are S.E.M. micrographs of a grain of sodium bicarbonate.
Figure 2B:
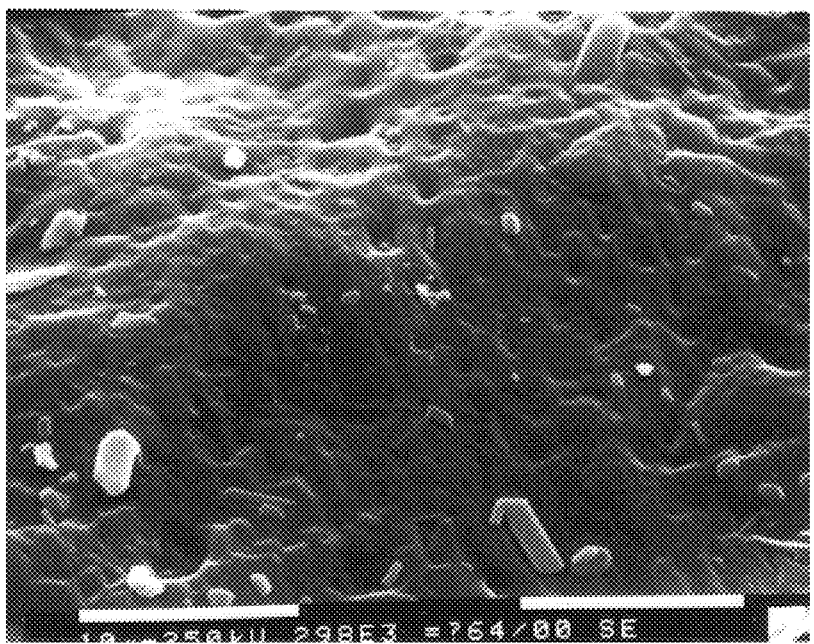

The active sodium carbonate obtained by the method of the invention comprises micronic particles agglomerated into a highly porous structure, as shown by a scanning electronic microscope in FIGS. 1A and 1B. It hence has a structure which is considerably different from the structure of a grain of sodium bicarbonate prior to the decarbonation reaction (FIGS. 2A and 2B).

In particular, this structure is characterised by the presence of large pores, a specific surface of 4.37 $m^2/g$, a heap density of 0.82 g/cc, a void ratio of 37% and a particle size of about two microns.

It is precisely the structure shown in FIGS. 1A and 1B, obtainable only by the decarbonation treatment of the invention, which enables the carbonate to be effective at high temperature in the acid compound removal process, in particular for hydrochloric acid.

FIGS. 1A, 1B and 2A, 2B show SEM micrographs at 600X and 2980X of the surface of a particle of $Na_2CO_3$ obtained by the process of the invention, and of the surface of a particle of commercial sodium bicarbonate (Solvay pharmaceutical bicarbonate BICAR CODEX) respectively.

The parameters which have proved critical for the production of a reactant effective in the subsequent removal reaction are the composition of the gas in contact with the solid, the decarbonation temperature and the consequent reaction rate.

In this respect it has been verified (and is reported in Comparative Example 2) that products obtained with different decarbonation reaction parameters have different structures, characterised by a large specific surface deriving from the formation of very numerous pores of small diameter, and are not active in removing acid compounds at temperatures exceeding 400° C., showing their maximum activity around 200° C.

The active compound can be prepared in reactors of various types, under static or dynamic conditions, with a continuous or discontinuous fluidized bed.

Figure 3:
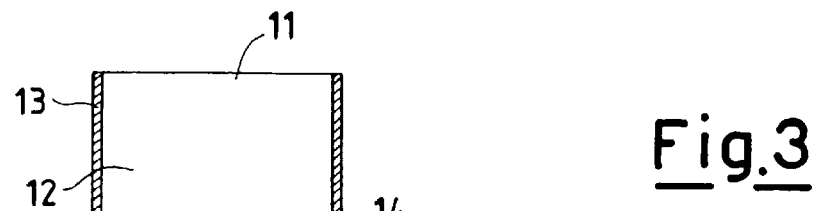
FIG. 3 shows a carbonate preparation method.

In particular, the carbonate preparation method can be conducted in the system A shown in FIG. 3, consisting of a fluidized bed reactor 11 formed from a pyrex glass cylinder of 77 mm diameter with a conical base 12, insulated externally with ceramic fibre 13. A porous frit 14 is positioned 130 mm from the reactor end. A gaseous stream of air, $CO_2$ and $H_2O$ preheated to above the reaction temperature by an electrical heat exchanger using glycol as the intermediate fluid is fed into the reactor lower end 15 (diameter 8 mm). As soon as the system reaches the reaction temperature, the reactor is loaded with the bicarbonate. Flow and temperature control are effected by a computerized system. The preparation process can also be conducted in the system B shown in FIG. 4A, in which the reactor 21 consists of a pyrex glass vessel 22 of 200 mm useful height and having a diameter of 135 mm with an outer jacket 23 of diameter 180 mm. Glycol circulates in closed circuit between the jacket 23 and suitable heating coils. The temperature is controlled by an electronic controller acting on the resistance heating elements, with an expansion vessel 24 compensating volume variation as the temperature varies.

A gaseous stream of air, $CO_2$ and/or $H_2O_{vap}$ of known flow rate preheated to the reaction temperature is fed into the lower part of the reactor 25, which is separated from the upper part by a porous baffle 26. When the system reaches the set temperature, the reactor 21 is loaded through its top end with $NaHCO_3$.

Figure 4:
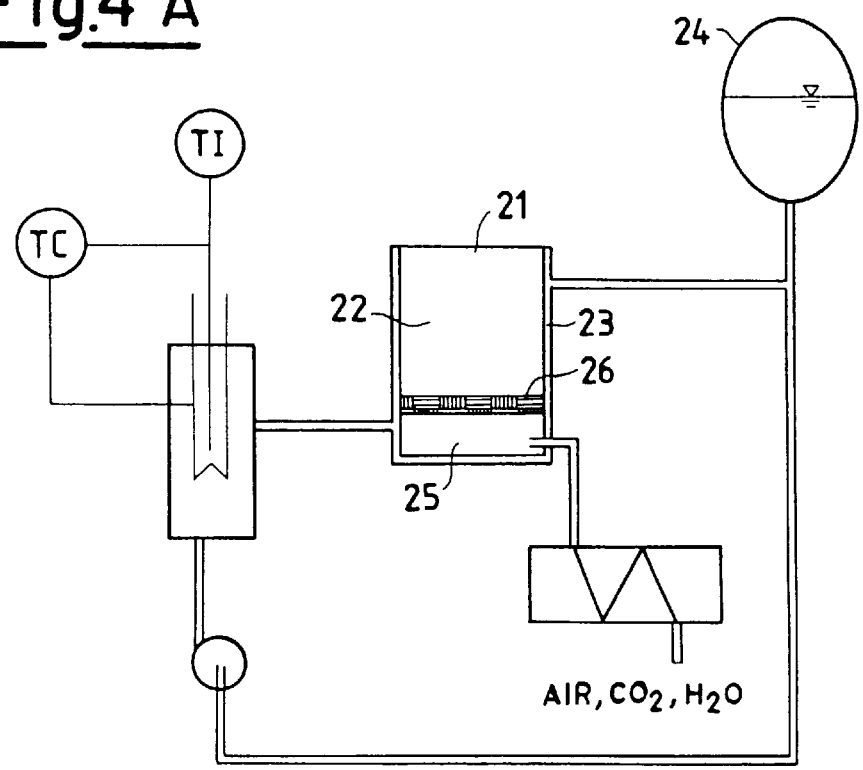
FIG. 4A shows a different carbonate preparation method
FIG. 4B shows still another carbonate preparation method.
Figure 4:
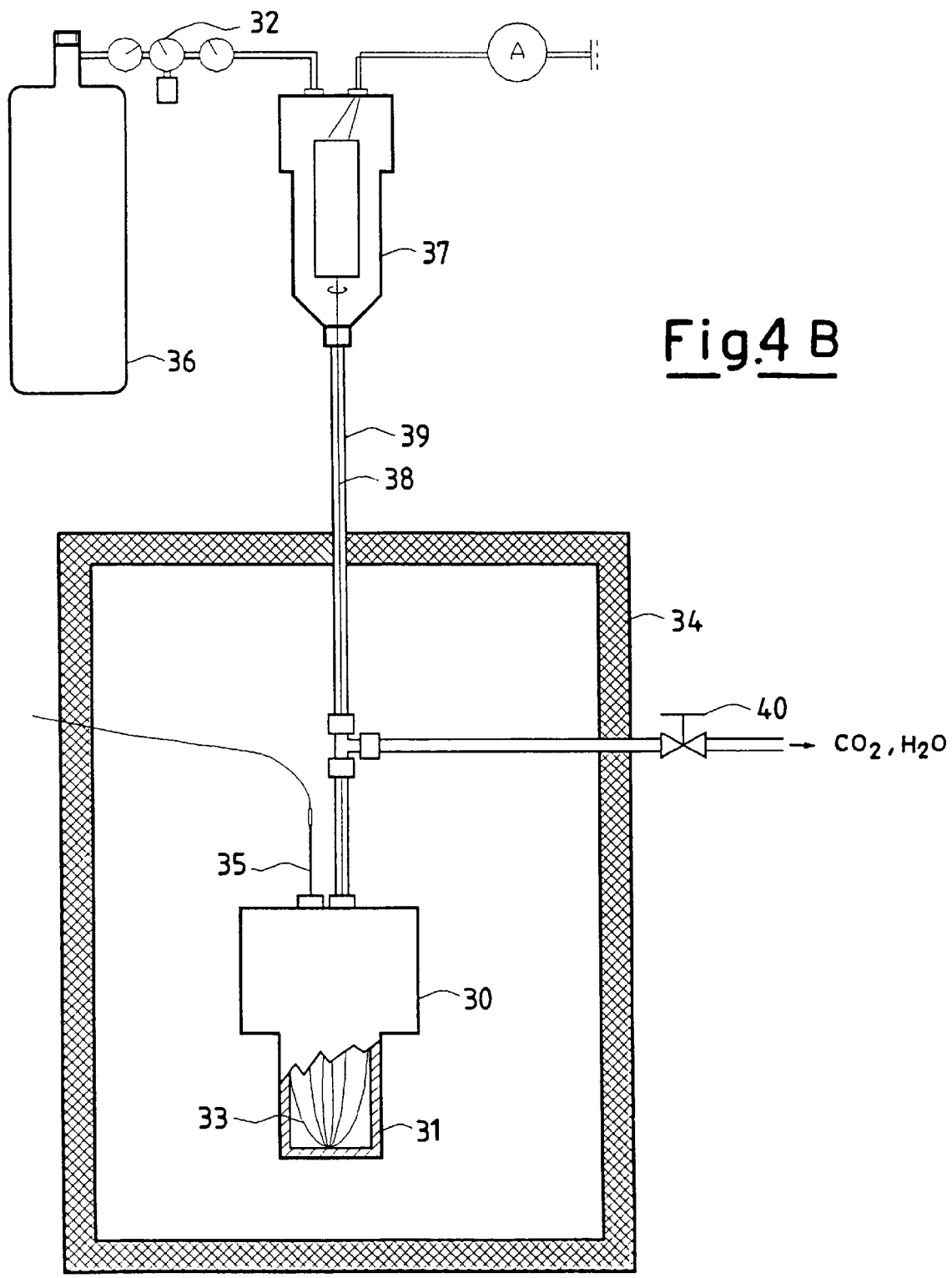

The preparation process can also be conducted in a system C shown in FIG. 4B, in which the reactor 30 consists of a pressure-resistant metal vessel 31 of useful height 150 mm and diameter 55 mm, fitted with a pressurization system 32, a mechanical stirrer 33 and a system 34 for measuring the current absorbed by the motor of the stirrer 33. The reactor 30 is located within an oven 34 provided with electric heating and with a temperature control system, these not being shown in the figure. The temperature within the reactor 30 is measured by a thermocouple 35, the signal of which is recorded by an electronic data acquisition system, not shown in the figure. The reactor operating pressure is fixed by the pressurization system 32 via the pressure reducer of a nitrogen cylinder 36 which feeds a stream of this gas through a pipe connected to the pressurized container 37 of the mechanical stirrer 33. The shaft 38 of the mechanical stirrer 33 is positioned within a metal tube 39 connected to the reactor 30.

The gas flowing through the tube 39 joins the gas produced by the decomposition of the bicarbonate contained in the reactor 30 and is expelled to atmosphere, together with this latter gas, through the valve 40.

The temperature of the oven 34 is fixed according to the pressure set by the pressurization system 32.

The starting material used was commercial sodium bicarbonate, which was sieved to obtain a reactant with good fluidization characteristics to obtain a product without fines, which could be separated from the gas by cyclones, as provided for example in the process claimed in Italian Patent N. 1272205.

Specifically, $NaHCO_3$ was used having a particle size of between 53 and 125 microns.

The following examples are provided as illustration.

EXAMPLE 1

A starting material consisting of 474 g of $NaHCO_3$ having a particle size of between 75 and 125 microns was decarbonated in the fluidized bed reactor shown in FIG. 4A, at a temperature of between 112° C. and 118° C., for a time of 8.5 hours, by fluidization with a stream of air, $H_2O$ and $CO_2$ of total flow rate 41.5 Nl/min, and with a volumetric composition of 65% air, 17.5% $H_2O$ and 17.5% $CO_2$, at an $H_2O$ and $CO_2$ partial pressure of 266 mm Hg.

Figure 5:
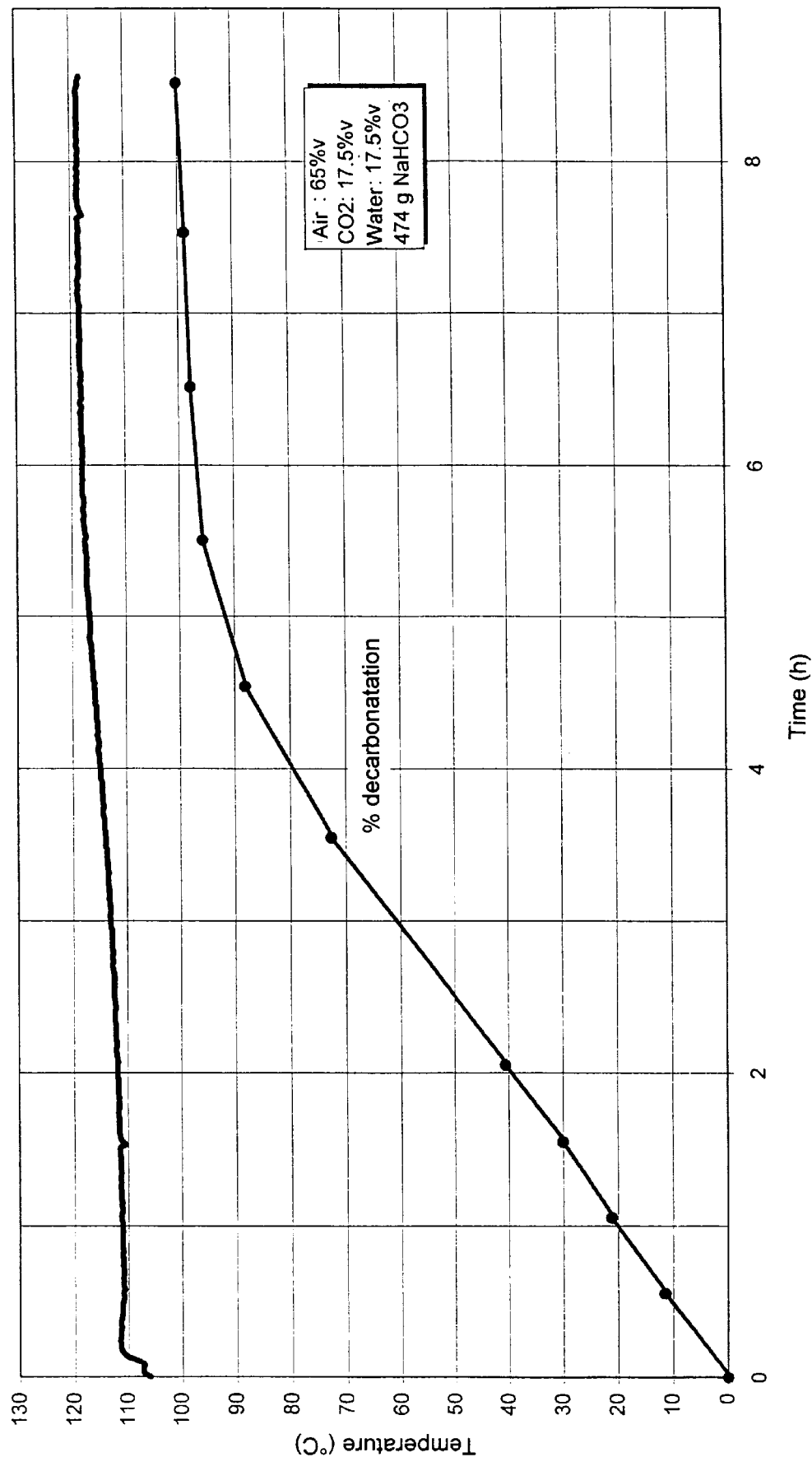
FIG. 5 is a graph showing temperature as a function of time in a decarbonation reaction.

The progress of the decarbonation as a function of time and the temperature as a function of time are shown in FIG. 5. The product obtained, consisting of more than 98% $Na_2CO_3$, and having the morphology shown in FIG. 6A, has large pores and a particle size of about two microns. Its specific surface, measured by a Carlo Erba Sorpomatic 1900, is 4.37 m²/g. After heating to 500° C. for 1 hour its specific surface is 2.80 m²/g. It was then used in an acid compound removal process.

Specifically, the active carbonate was tested in a reactor in which the following reaction took place at fixed temperature:

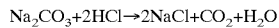

$$Na_2CO_3 + 2HCl \rightarrow 2NaCl + CO_2 + H_2O$$

Figure 7:
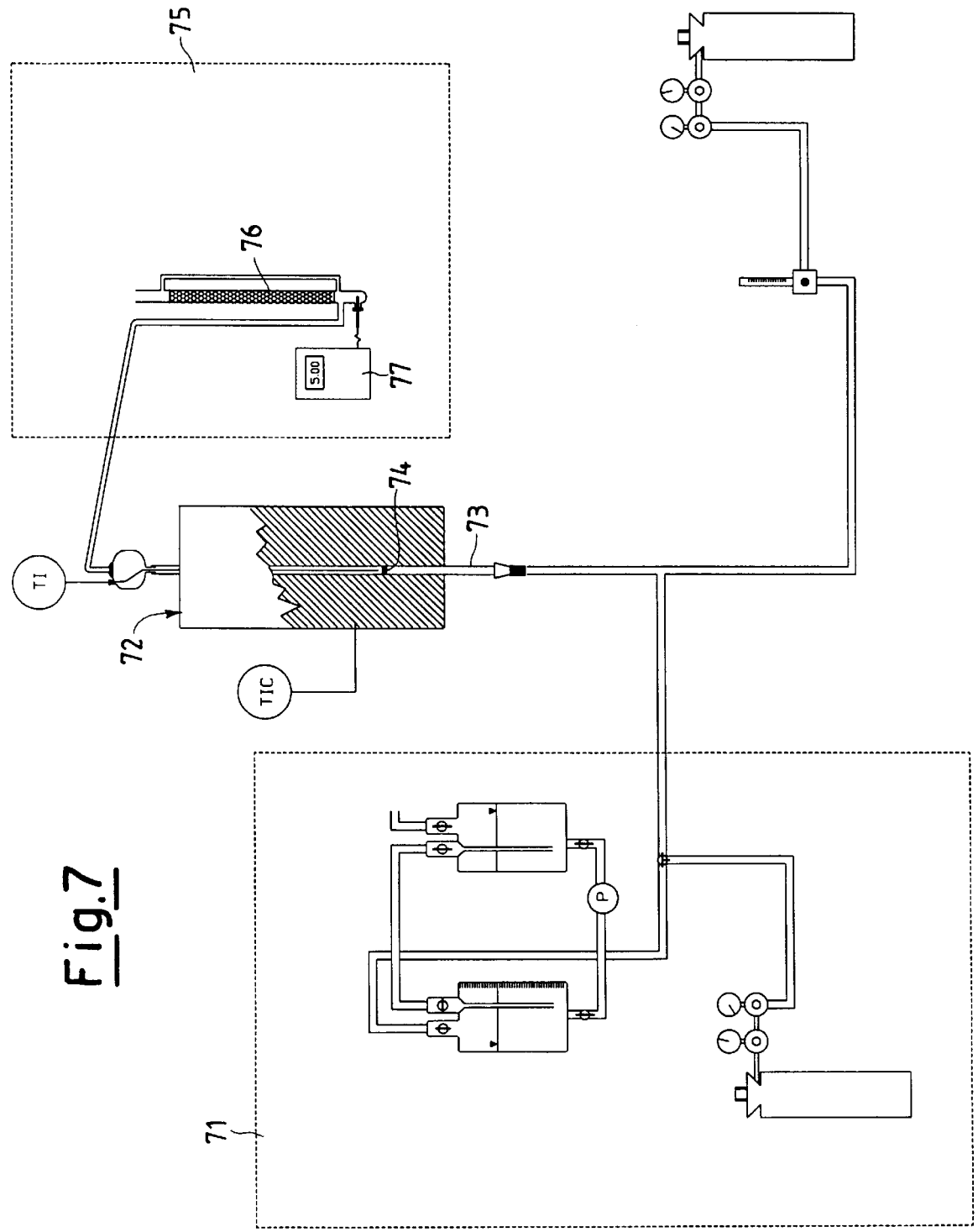
FIG. 7 shows a reactivity testing plant.

The activity of a product such as an acid compound sorbent at high temperature was determined by a standardized technical test in accordance with the following procedure: a known quantity of the product to be tested (3 g), mixed with 17 g of SiO2 with a particle size of between 53 and 180 microns, is placed in the temperature-controlled reactor shown in FIG. 7, which is at a temperature of 500° C. Specifically, the reactivity testing plant shown in FIG. 7 comprises three main units, namely a first unit (71) for feeding and metering the gaseous HCl; a second unit consisting of a fluidized bed reactor consisting of a cylindrical quartz tube 73 (diameter 20 mm, length 750 mm) with a 3 mm porous frit 74 positioned 390 mm from the lower end of the reactor, and provided with a heating and insulation system 72, the temperature within the reactor, measured by a suitably positioned thermocouple, being set, monitored and recorded by a computerized system; and finally a third unit consisting of a wash system 75 for the gas leaving the reactor 76, and a pH measurement system 77.

An air flow of 0.5 Nl/min is then fed through the reactor. After about 2–8 minutes, ie once the reactor temperature has stabilized, gaseous hydrochloric acid is metered in by the eudiometer 71. A quantity of hydrochloric acid equivalent to a flow rate of 0.025 Nl/min is fed in by transferring 2000 cc of oil by means of the peristaltic pump. The equivalents of gaseous hydrochloric acid fed in are 1.47 times the equivalents contained in the tested sodium carbonate, in order to be able to note the emergence of hydrochloric acid in the column in which the gas is washed with water, even if the acid gas is stoichiometrically removed by the tested sorbent.

Figure 8:
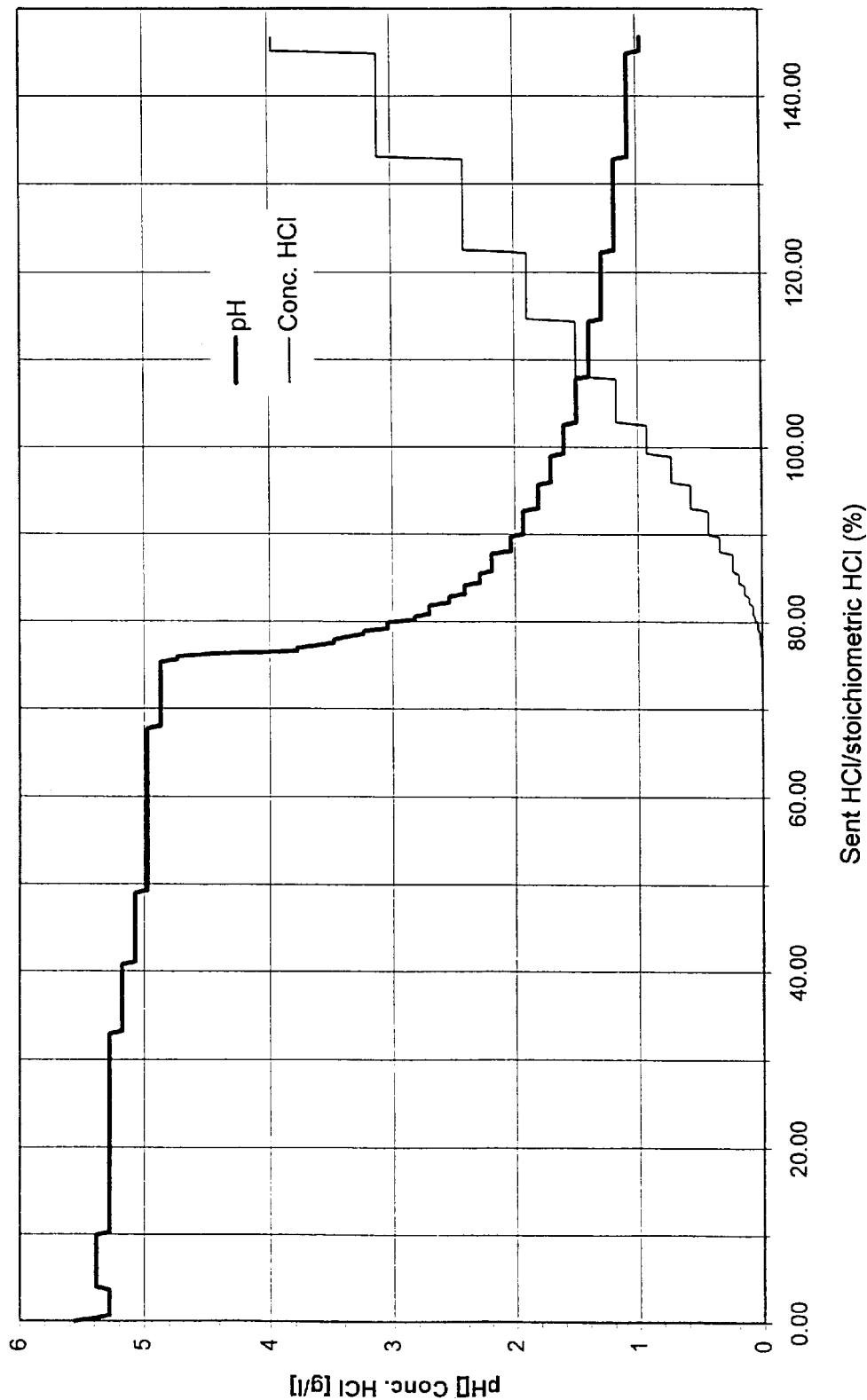
FIG. 8 shows a graph of pH and concentration of HCl for reactivity at 500° C. of a decarbonated bicarbonate in a thermostated fluid bed.

The percentage of carbonate converted for the acid fed in and hence the carbonate reactivity can be obtained by measuring the pH of the aqueous solution in which the unconverted hydrochloric acid is absorbed, and by chloride analysis at the end of the test. The pH curve shows that this remains at a high value (greater than 4) for the entire time during which the sodium carbonate is effective against the hydrochloric acid. When this is no longer completely retained by the sorbent solid and dissolves in water, there is a consequent lowering of the solution pH. FIG. 8 shows the variation in the wash solution pH as a function of the hydrochloric acid quantity fed.

The activity of the carbonate obtained in this example was tested as already described, ie a 0.5 Nl/min air stream mixed with a 0.025 Nl/min hydrochloric acid stream was fed into the reactor at reaction temperature, where the described reaction took place. The exit gas was fed to a bubbler and then released into the atmosphere, the acid not retained by the solid becoming dissolved in the aqueous solution present in the bubbler and being determined by the reduction in the solution pH.

The carbonate obtained in this example is extremely reactive, removing all the acid fed in up to about 77% of the stoichiometric quantity. Analysis of the reaction product at the end of the test showed an NaCl content of 86.3%.

EXAMPLE 2 (comparative)

A starting material consisting of 60 g of $NaHCO_3$ of particle size between 75 and 125 microns is decarbonated by heat treatment in a fluidized bed in the reactor shown in FIG. 3, at a temperature of between 120° C. and 130° C. for 5 hours using only air at a flow rate of 20 Nl/min. The product, the morphology of which is shown in FIG. 6B, has numerous small-dimension pores and has a large specific surface, of 8.24 m₂/g. This value falls to 1.84 m₂/g after heating the product to 500° C. for 1 hour.

When subjected to thermogravimetric analysis, the product shows an exothermic peak at a temperature of about 400° C., this not being found in the product of Example 1. This different behaviour evidently indicates a structural change.

When used in an acid compound removal process analogous to that described in Example 1, this product gave the following results:

acid retained before the pH fall: 13% of the stoichiometric value;

solid composition at end of test: 18% NaCl.

The poor high temperature reactivity of the product obtained in Example 2 derives from the specific surface reduction consequent on the structural changes noted by the thermogravimetric analysis.

EXAMPLE 3

A starting material consisting of 475 g of $NaHCO_3$ of particle size between 75 and 125 microns is decarbonated by heat treatment in the fluidized bed reactor shown in FIG. 4A, at a temperature of between 110° C. and 115° C. for 5 hours by fluidization with an air and $H_2O$ stream at a total flow rate of 31 Nl/min and with a volumetric composition of 65% air and 35% $H_2O$, at an $H_2O$ partial pressure of 266 mm Hg.

Figure 6A:
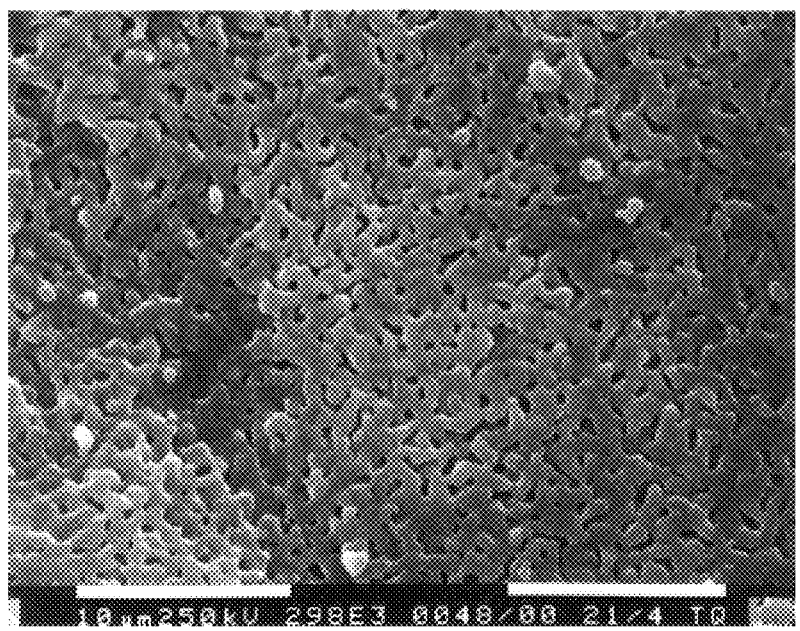
FIGS. 6A and 6B are S.E.M. micrographs of products of Example 1 and Example 2 (comparative), respectively.
Figure 6B:
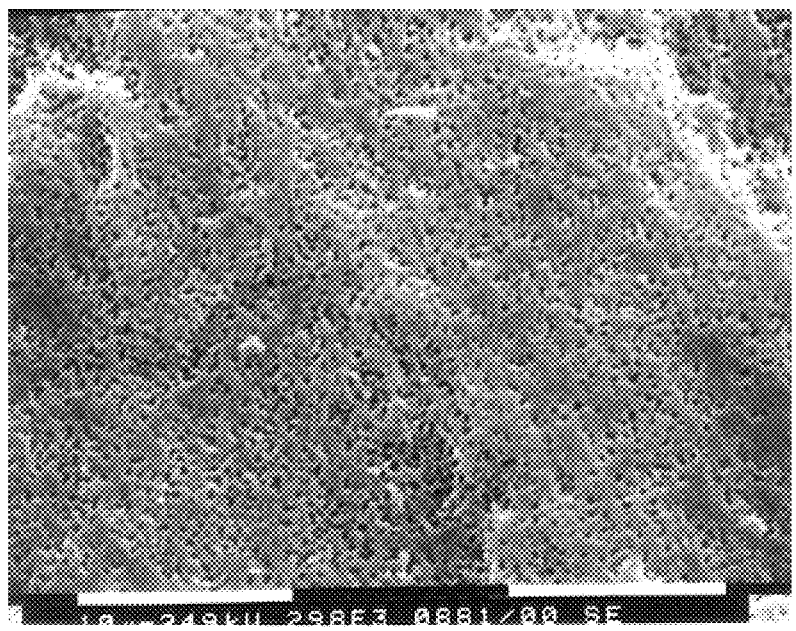

The product obtained has a morphology similar to that shown in FIG. 6A. When used in the acid compound removal system described in Example 1, at a temperature of 500° C., this carbonate gave the following results:

acid retained before the pH fall: 96.15% of the stoichiometric value;

solid composition at end of test: 98.99% NaCl.

EXAMPLE 4

A starting material consisting of 400 g of $NaHCO_3$ of particle size between 53 and 500 microns is decarbonated by heat treatment in the pressurizable reactor shown in FIG. 4B, at a temperature of between 170° C. and 200° C. for 18 hours, the reactor pressure being maintained at 10 bars absolute, and the product being maintained in contact only with its gaseous decomposition products.

The product obtained has a morphology similar to that shown in FIG. 6A. When used in the hydrochloric acid compound removal system described in Example 1, at a temperature of 550° C., this carbonate gave the following results:

acid retained before the pH fall: 89.4% of the stoichiometric value;

solid composition at end of test: 95.68% NaCl.

EXAMPLE 5

A starting material consisting of 400 g of $NaHCO_3$ of particle size between 75 and 180 microns is decarbonated by heat treatment in the pressurizable reactor shown in FIG. 4B, at a temperature of between 180° C. and 195° C. for 20 hours, the reactor pressure being maintained at 16 bars absolute, and the product being maintained in contact only with its gaseous decomposition products.

The product obtained has a morphology similar to that shown in FIG. 6A. When used in the hydrochloric acid compound removal system described in Example 1, at a temperature of 550° C., this carbonate gave the following results:

acid retained before the pH fall: 87.20% of the stoichiometric value;

solid composition at end of test: 89.09% NaCl.

EXAMPLE 6

A starting material consisting of 120 g of $NaHCO_3$ of particle size between 106 and 125 microns is decarbonated by heat treatment in the pressurizable reactor shown in FIG. 4B, with the stirrer in operation, at a temperature of between 170° C. and 175° C. for 20 hours, the reactor pressure being maintained at 10 bars absolute, and the product being maintained in contact only with its gaseous decomposition products.

The product obtained has a morphology similar to that shown in FIG. 6A. When used in the hydrochloric acid compound removal system described in Example 1, at a temperature of 550° C., this carbonate gave the following results:

acid retained before the pH fall: 97.59% of the stoichiometric value;

solid composition at end of test: 99.81% NaCl.

When used in the hydrochloric acid compound removal system described in Example 1 at a temperature of 580° C., the same carbonate gave the following results:

acid retained before the pH fall: 78.96% of the stoichiometric value;

solid composition at end of test: 82.85% NaCl.

EXAMPLE 7

A starting material consisting of 60 g of $NaHCO_3$ of particle size between 53 and 500 microns is decarbonated by heat treatment in the fluidized bed reactor shown in FIG. 3, at a temperature of between 105° C. and 120° C. for 22 hours by fluidization with a stream of total flow rate 11 Nl/min, consisting of 54.6 vol % air, 22.7 vol % $H_2O$ and 22.7 vol % $CO_2$.

The product obtained has a morphology similar to that shown in FIG. 6A. When used in the hydrochloric acid compound removal system described in Example 1, at a temperature of 500° C., this carbonate gave the following results:

acid retained before the pH fall: 75.0% of the stoichiometric value;

solid composition at end of test: 79.33% NaCl.

Table B below shows the physical characteristics measured for the activated products obtained in Examples 1 and 2.

TABLE B

| Compound | Heap density g/cc | Specific surface $m^2/g$ | Void ratio % | Particle size microns |
|---|---|---|---|---|
| Bicarbonate | 1.30 | — | — | 53–125 |
| C. Erba carbonate by analysis | 1.24 | 0.40 | 18 | 53–125 |
| Carbonate (Ex. 1) | 0.82 | 4.37 | 37 | 75–125 |
| Carbonate (Ex. 1) heated to 500° C. | | 2.80 | | |
| Carbonate (Ex. 2) | 0.82 | 8.24 | 37 | 75–125 |
| Carbonate (Ex. 2) heated to 500° C. | | 1.84 | | |

The graph of FIG. 9 shows a comparison between the reactivity at 500° C. of the compounds of Examples 1–3 and 7, the reactivity at 550° C. of the compounds of Examples 4, 5 and 6, and the reactivity at 580° C. of the compound of Example 6.

This graph shows clearly that the product of the invention has a considerably higher activity than the product prepared by the methods of the state of the art.

The Italian priority application No. MI97A 001225 is herein incorporated by reference.

We claim:

1. A method for preparing sodium carbonate comprising heat treating sodium bicarbonate $NaHCO_3$ at a temperature of between 80 and 250° C., at an operating pressure of between greater than 1 and 20 bars absolute, wherein said heat treating is carried out in the absence of an activation gas or in the presence of a activation gas containing $H_2O$ and /or $CO_2$.

2. The method as claimed in claim 1, wherein the temperature is between 120 and 170° C.

3. The method as claimed in claim 2, wherein the temperature is between 120 and 140° C.

4. The method as claimed in claim 1, wherein the heat treating is conducted in the presence of said activation gas with a molar fraction of $H_2O$ and/or $CO_2$ of between 0.13 and 1.

5. The method as claimed in claim 4, wherein the heat treating temperature is between 100 and 120° C. and the molar fraction of $H_2O$ and/or $CO_2$ is between 0.26 and 0.60.

6. The method as claimed in claim 4 or 5, wherein the activation gas is a mixture of air and/or inert gas, $H_2O_{vap}$ and/or $CO_2$.

7. The method as claimed in claim 6, wherein the $H_2O_{vap}$ and $CO_2$ content is a total of about 35% by volume.

8. The method as claimed in claim 1, wherein the starting sodium bicarbonate has a particle size of between 53 and 125 microns.

9. Sodium carbonate obtainable by the method of claim 1.

10. Carbonate as claimed in claim 9, and having a specific surface of 4.37 m²/g, a heap density of 0.82 g/cc, a void ratio of 37% and a particle size of about two microns.

11. The method as claimed in claim 1, wherein the temperature is based on the operating pressure, and is between the temperature at which the reaction equilibrium pressure of the following reaction $$2NaHCO_3 \rightarrow Na_2CO_3 + H_2O + CO_2,$$

equals said operating pressure, and a temperature 50° C. higher.

12. The method as claimed in claim 11, wherein the temperature is between the temperature at which the reaction equilibrium pressure equals said operating pressure and a temperature 20° C. higher, and wherein said heat treating is carried out in the absence of activation gas.

13. the method as claimed in claim 1, wherein said heat treating is carried out in the absence of said activation gas.

14. The method as claimed in claim 1, wherein said heat treating is carried out in the presence of said activation gas.

15. The method as claimed in claim 14, wherein the temperature is based on the operating pressure, and is between the temperature at which the reaction equilibrium pressure of the following reaction $$2NaHCO_3 \rightarrow Na_2CO_3 + H_2O + CO_2,$$

equals said operating pressure, and a temperature 20° C. lower, and wherein said heat treating is carried out in the presence of activation gas.

16. The method as claimed in claim 15, wherein the molar fraction of $H_2O$ and/or $CO_2$ in said activation gas is between 0.26 and 0.60.

* * * * *

UNITED STATES PATENT AND TRADEMARK OFFICE
CERTIFICATE OF CORRECTION

PATENT NO. : 6,099,817

DATED : August 8, 2000

INVENTOR(S): Luigi LACQUANITI, et al.

It is certified that an error appears in the above-identified patent and that said Letters Patent is hereby corrected as shown below:

On the Title Page, Item [75] the 2nd Inventor's Name is incorrect. Item [75] should read as follows:

[75] Inventors: Luigi Lacquaniti; Giuseppe Liuzzo; Marcello Palitto; Nicola Verdone, all of Rome, Italy

-ALSO-

On the Title Page, Item [30] the Foreign Application Priority Data is incorrect. It should read as follows:

[30] Foreign Application Priority Data

May 26, 1997 [IT] Italy ................................. MI 97A 001225

Signed and Sealed this

Twenty-second Day of May, 2001

*Attest:*

NICHOLAS P. GODICI

*Attesting Officer*     *Acting Director of the United States Patent and Trademark Office*